United States Patent
Berner et al.

(10) Patent No.: US 10,551,259 B2
(45) Date of Patent: Feb. 4, 2020

(54) TORQUE SENSOR WITH MATHEMATICALLY SMOOTH CLAWS

(71) Applicant: Bourns, Inc., Riverside, CA (US)

(72) Inventors: Sebastian Berner, Munich (DE); Benno Pichler, Aying (DE); Andreas Sommer, Prien (DE)

(73) Assignee: BOURNS, INC., Riverside, CA (US)

( * ) Notice: Subject to any disclaimer, the term of this patent is extended or adjusted under 35 U.S.C. 154(b) by 0 days.

(21) Appl. No.: 15/987,263

(22) Filed: May 23, 2018

(65) Prior Publication Data
US 2018/0340853 A1    Nov. 29, 2018

(30) Foreign Application Priority Data
May 23, 2017    (DE) .................. 10 2017 111 305

(51) Int. Cl.

| | |
|---|---|
| *G01L 5/00* | (2006.01) |
| *G01L 5/22* | (2006.01) |
| *G01L 3/10* | (2006.01) |
| *B62D 6/10* | (2006.01) |
| *B62D 15/02* | (2006.01) |
| *B62D 5/04* | (2006.01) |

(52) U.S. Cl.
CPC ............... *G01L 5/221* (2013.01); *B62D 6/10* (2013.01); *B62D 15/0215* (2013.01); *G01L 3/101* (2013.01); *G01L 3/104* (2013.01); *B62D 5/0409* (2013.01); *B62D 5/0481* (2013.01)

(58) Field of Classification Search
CPC ......... G01L 5/221; G01L 3/101; G01L 3/104; B62D 6/10; B62D 15/0215; B62D 5/0409; B62D 5/0481

USPC .................................................... 73/862.193
See application file for complete search history.

(56) References Cited

U.S. PATENT DOCUMENTS

| | | | |
|---|---|---|---|
| 2002/0189371 A1 | 12/2002 | Nakane et al. | |
| 2004/0093961 A1 | 5/2004 | Nakane et al. | |
| 2007/0295109 A1* | 12/2007 | Tokumoto | ......... B29C 45/14065 73/862.331 |
| 2008/0150379 A1* | 6/2008 | Hsiao | ..................... H02K 1/145 310/81 |

(Continued)

FOREIGN PATENT DOCUMENTS

| | | |
|---|---|---|
| EP | 2592404 A1 | 5/2013 |
| JP | H0348714 U | 5/1991 |

*Primary Examiner* — Max H Noori
(74) *Attorney, Agent, or Firm* — Michael, Best & Friedrich LLP

(57) ABSTRACT

A stator to guide a location-dependent magnetic field in a circumferential direction around a rotation axis. In one example, the stator includes a first stator ring revolving around the rotation axis, and a second stator ring revolving around the rotation axis and arranged concentrically with the first stator ring. The first and second stator rings include claws which are arranged so as to revolve around the rotation axis and at a distance from one another in the circumferential direction and engage with one another at least on a toothing axial plane. The claws are separated from one another by an air gap so that, when the magnetic field is arranged in the toothing axial plane, the magnetic field is guided towards the stator rings via the claws according to a relative angular position. Each claw has the contour of a mathematically smooth curve when viewed across the circumferential direction.

14 Claims, 5 Drawing Sheets

(56) References Cited

U.S. PATENT DOCUMENTS

Figure 1:
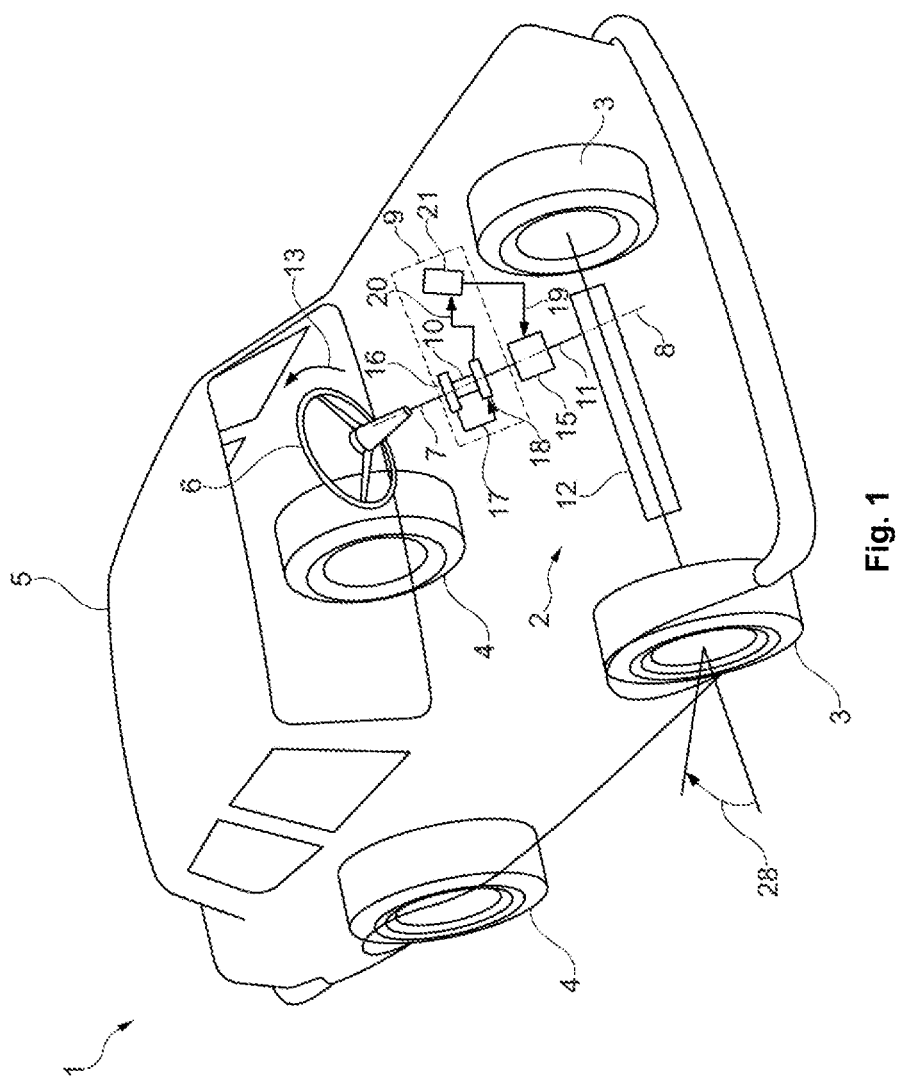

| | | | |
|---|---|---|---|
| 2010/0207476 A1* | 8/2010 | Yoshizawa | H02K 21/044 310/156.12 |
| 2010/0257947 A1* | 10/2010 | Matsumoto | G01L 3/104 73/862.333 |
| 2015/0084470 A1* | 3/2015 | Takemoto | H02K 1/2713 310/156.69 |
| 2015/0222152 A1* | 8/2015 | Yamada | H02K 5/02 310/68 B |
| 2018/0339729 A1* | 11/2018 | Berner | G01L 3/104 |

* cited by examiner

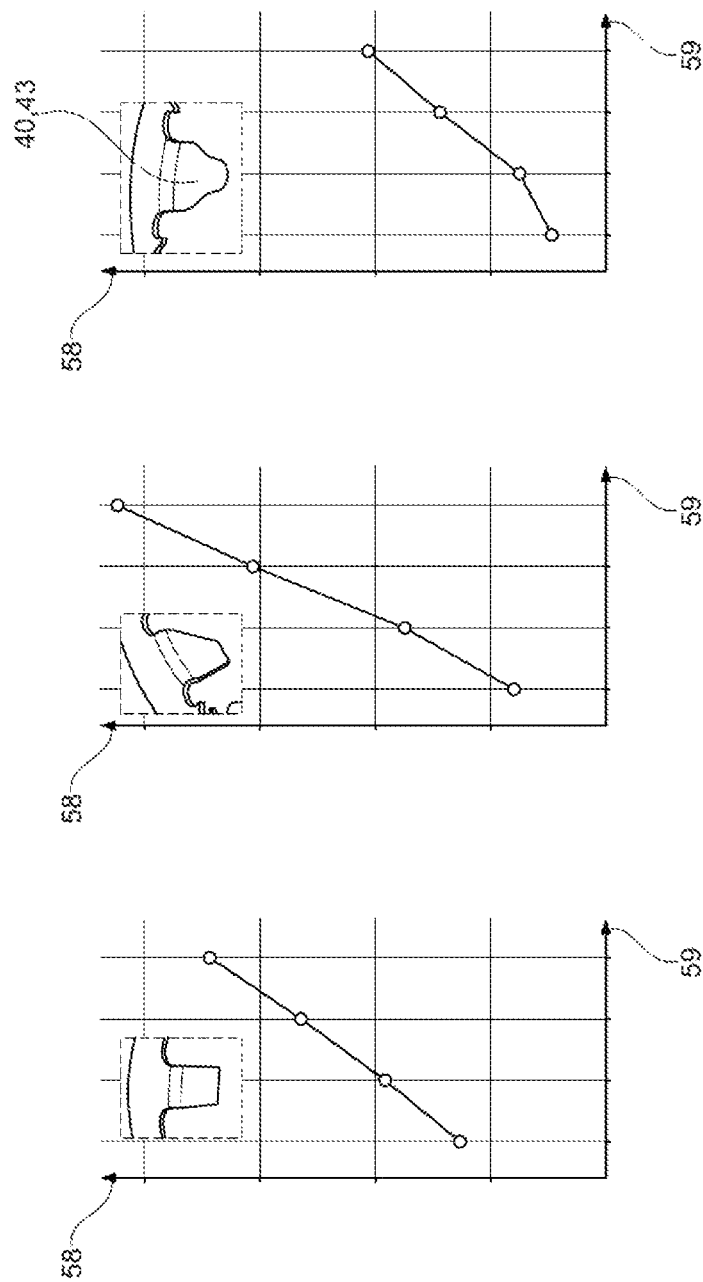

TORQUE SENSOR WITH MATHEMATICALLY SMOOTH CLAWS

The present invention relates to a stator to guide a location-dependent magnetic field around a rotation axis in a circumferential direction and to a torque sensor comprising the stator.

A stator for a torque sensor according to the preamble of the current claim 1 comprising claws having the contour of rectangles when viewed across the circumferential direction is known from JPH03-048714U. A stator for a torque sensor according to the preamble of the current claim 1 comprising claws having the contour of trapezoids when viewed across the circumferential direction is known from FR 2872902 B1. A stator for a torque sensor according to the preamble of the current claim 1 comprising sawtooth-shaped claws having the contour of triangles when viewed across the circumferential direction is known from DE 102 22 118B4.

The task of this invention is to improve the known stators for torque sensors.

According to an aspect of the invention, a stator to guide a location-dependent magnetic field around a rotation axis in a circumferential direction comprises a first stator ring revolving around the rotation axis, and a second stator ring being arranged concentrically with the first stator ring and revolving around the rotation axis, the first and second stator ring comprising claws which are arranged so as to revolve around the rotation axis and at a distance from one another in the circumferential direction and engage with one another at least on a toothing axial plane, said claws being separated from one another by an air gap in such a way that, when the magnetic field is arranged in the toothing axial plane, the magnetic field is guided towards the stator rings via the claws according to a relative angular position. According to the invention, each claw has the contour of a mathematically smooth curve when viewed across the circumferential direction.

The invention is based on the idea that an output signal of a torque sensor should not change in an idle position without torques acting on it. However, it becomes evident that this is not the case when the torque sensor, according to the preamble of the current claim 1, is applied in a vehicle to detect a steering torque. In the vehicle, the steering torque is usually received by a first steering shaft which transfers the steering torque to a second steering shaft via a twistable torsion element. The higher the torsion of the torsion element, the higher the steering torque acting on the steering shafts. The torque sensor detects the torsion of the torsion element and outputs the output signal according to the torsion. If the two steering shafts, however, are interconnected in a rigid, i.e. not twistable, manner, the output signal of the torque sensor should not change, even if the two steering shafts are turned.

Examinations have shown, however, that the output signal of all the torque sensors mentioned at the outset changes more or less periodically, even if the steering shafts are turned. The output signal changes under the above-mentioned condition, that the steering shafts are rigidly connected and turned, with a peak-to-peak distance which is particularly high in claws with a trapezoidal design. However, the peak-to-peak distance is also clearly visible in the case of the other claw shapes. Such behaviour of the output signal is recorded as an error when the steering torque is measured.

The said stator is based on the knowledge that all the torque sensors mentioned at the outset comprise stators in which the claws have corners when viewed from a radial perspective. In contrast, the said stator suggests forming the claws to be free of corners when viewed from a radial perspective, so that the claws have the contour of a mathematically smooth curve when viewed across the circumferential direction. Examinations of torque sensors comprising stators designed in such a way showed that the above-mentioned peak-to-peak distance can be halved in the case of two rigidly connected and turned steering shafts, thus increasing the reliability of the steering torque detection significantly.

In an embodiment of the said stator, each claw has a base, above which a head is supported on the respective stator ring, said head being smaller than the base when viewed in the circumferential direction. The wider bases ensure that the magnetic flux is transmitted between the teeth equally as well as in the case of teeth having a trapezoidal design, but with a significantly smaller peak-to-peak distance in the output signal if the steering shafts are rigidly connected and turned.

In an additional embodiment of the said stator, in each claw, the base and the head merge with one another in a transition region having a curve which is negative starting from a base curve. In this way, the claws can be brought together very closely when they engage with one another axially, so that the air gap between the claws can be small. The smaller the air gap, the smaller the stray magnetic field.

In a further embodiment of the said stator, the base curve and the curve of the transition region have the same dimensions. In this way, the air gap between the claws is constant.

In a preferred embodiment of the said stator, the head, when viewed in the circumferential direction, has an extension between a quarter and three quarters, in particular half of the extension of the base in the circumferential direction. In the case of rigidly connected, turned steering shafts, these values made it possible to achieve output signals with very low peak-to-peak distances, so that measurement errors could be reduced significantly.

In a further embodiment of the said stator, regions of the base and the head have circular or oval designs. These claw shapes are easy to produce.

In another embodiment of the said stator, the claws on each stator ring are arranged axis-symmetrically to one another in the circumferential direction. Alternatively or additionally, the claws can be arranged point-symmetrically to one another in the circumferential direction between the stator rings. Due to the symmetry, the torque sensor comprising the said stator behaves in the same manner, regardless of the direction in which it is turned.

In a further embodiment of the said stator, the edges of each claw are at a right angle to a plane in which their respective stator ring is positioned. In this way, the width of the base can be held above a certain axial height relative to the tapered head.

In accordance with a further aspect of the invention, to detect a torque between a first shaft and a second shaft, which are interconnected by a torsion bar, a sensor comprises one of the said stators which can be connected in a fixed manner to the first shaft, a magnetic field generator which can be connected in a fixed manner to the second shaft, and which is arranged co-axially with the rotation axis to generate and feed the magnetic field into the stator, and a magnetic field sensor to detect a magnetic field from the magnetic field generator passing the stator.

Figure 2B:
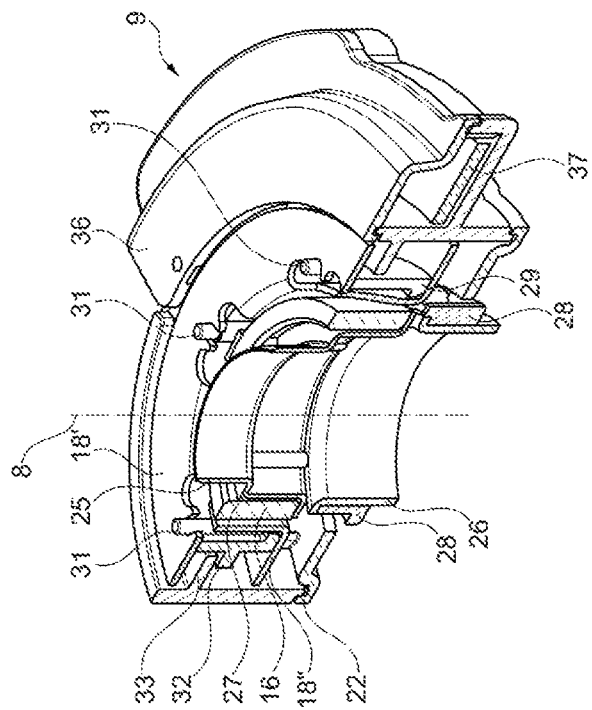
Figure 2A:
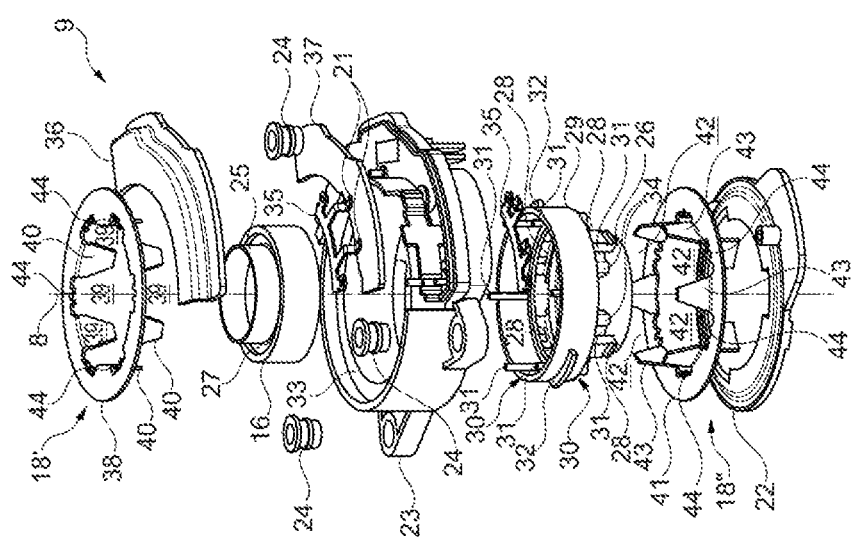
Figure 3:
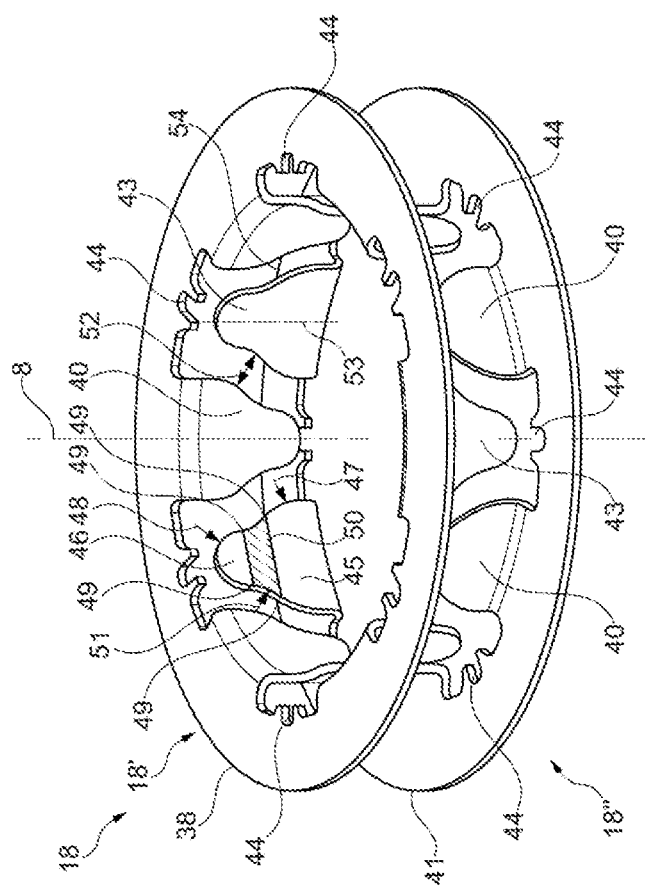
Figure 4:
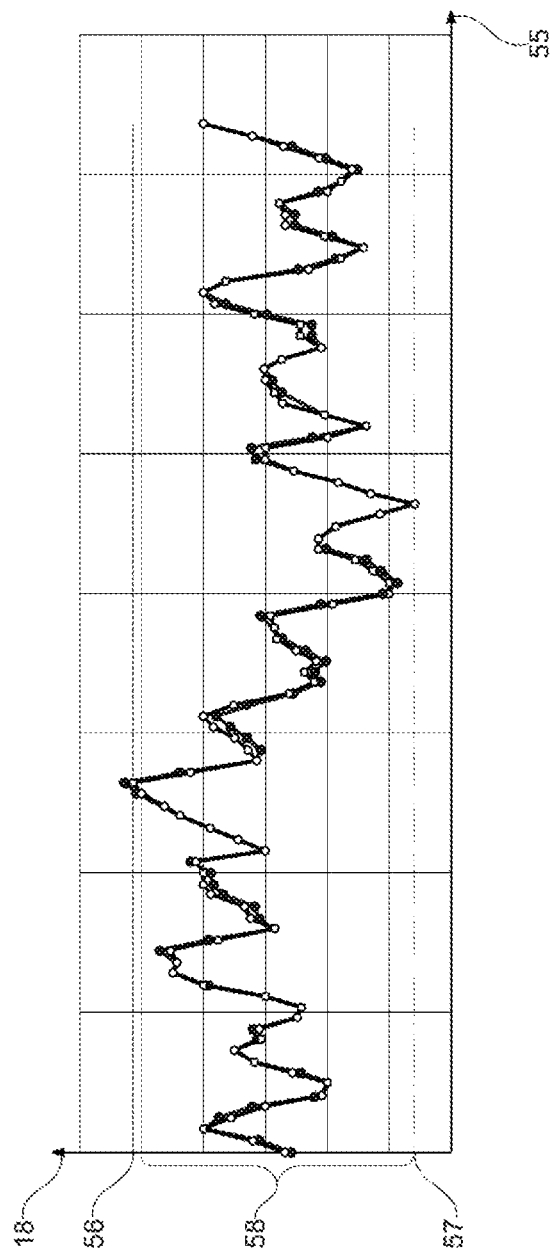

The above-described properties, features and advantages of this invention, as well as the manner in which they are achieved, will be made clearer in connection with the following description of the embodiments, which are described in more detail in connection with the drawings, in which:

FIG. 1 is a schematic perspective view of a vehicle comprising a steering system, FIG. 2a is a schematic exploded view of a torque sensor for the steering system from FIG. 1, FIG. 2b is a schematic perspective sectional view of a torque sensor from FIG. 2a, FIG. 3 is a schematic perspective view of a stator of the torque sensor from FIGS. 2a and 2b, FIG. 4 shows a curve of an output signal of the torque sensor from FIGS. 2a and 2b over a steering angle, assuming that steering shafts in the vehicle from FIG. 1 are rigidly interconnected, and FIGS. 5a to 5c show various curves of output signals of the torque sensor from FIGS. 2a and 2b according to various stators and differential angles of the steering shafts.

In the drawings, the same technical elements are provided with the same reference signs, and are only described once. The drawings are purely schematic, and, in particular, do not reflect the actual geometric proportions.

Reference is made to FIG. 1, which is a schematic perspective view of a vehicle 1 comprising a steering system 2.

In the present embodiment, the vehicle 1 comprises a chassis 5 supported by two front wheels 3 and two rear wheels 4. The front wheels 3 can be turned by the steering system 4 so that the vehicle 1 can be driven in a curve.

The steering system 2 comprises a steering wheel 6 which is mounted on a first steering shaft 7, which in turn is mounted so as to be able to rotate around a rotation axis 8. The first steering shaft 7 is guided into a torque sensor 9 and connected to a torsion element 10 in a way not shown in greater detail. A second steering shaft 11 is connected to said torsion element 10 on the side opposite the first steering shaft 7 on the rotation axis 8, and connected to a steering gear 12. If the steering wheel 6 is turned with a steering torque 13, the steering torque is transferred accordingly to the steering gear 12, which, in response, steers the front wheels 3 to drive in a curve with a wheel angle 14.

The steering process can be supported by an auxiliary motor 15 which can assist the second steering shaft 11 in turning. For this purpose, the torque sensor 9 detects the steering torque 13. The auxiliary motor 15 then steers the second steering shaft 11 inter alia according to the detected steering torque 13.

To detect the steering torque 13, the torque sensor 9 comprises a magnetic generator element 16 which is connected to the first steering shaft 7, and which induces a magnetic field 17. The steering torque sensor 13 also comprises a magnetic filter 18 which is connected to the second steering shaft 11 and which dampens the magnetic field 17 from the magnetic generator element 16 according to a relative angular position 19 of the first steering shaft 7 and thus of the magnetic generator element 16 to the second steering shaft 11 and thus to the magnetic filter 18, and transmits the dampened magnetic field 20 to at least one magnetic field sensor 21. Said sensor detects the dampened magnetic field 20 and, based on this, outputs the angular position 19 between the two shafts 7, 11 or a signal determined thereby. This angular position 19 or the signal determined thereby is directly determined by the steering torque 13 to be detected, so that the auxiliary motor 15 can process this information immediately.

In the following, the magnetic filter 18 is also referred to as a stator 18 because it is a more common term for the torque sensor 9 to be described in the following with reference to FIGS. 2a and 2b.

The torque sensor 9 comprises a housing 23 around the rotation axis 8 which can be closed by a housing lid 22, which can be screwed to the vehicle 1 using protective elements 24. Aligned with the rotation axis 8, the housing 23 receives a first bearing bush 25 for receiving the first steering shaft 7 with a force fit, and a second bearing bush 26 for receiving the second steering shaft 11 with a force fit.

The first bearing bush 25 is rigidly connected to the magnetic field generator element 16 by means of a connection means 27, such as an adhesive, so that the magnetic field generator element 16 is held in a fixed manner on the first steering shaft 7 when said shaft is pressed into the first bearing bush 25.

The second bearing bush 26 is held in a fixed manner on clamping elements 28 of a coupling element 29 which connects the stator 18 to the second bearing bush 26 in a fixed manner to be described later. For this purpose, the coupling element 29 substantially has the shape of a tube. Pins 31 project axially from the two end faces 30 of the coupling element 29, not all of which are marked with reference signs in FIG. 2a for the sake of clarity. These pins 31 hold the stator 18 on the coupling element 29 in a rotationally fixed manner which is described in more detail later. The coupling element 29 also has first axial supporting elements 32 on the sleeve side, onto which the coupling element 29 can be mounted axially on a support ring 33 of the housing 23. To mount the coupling element axially on the housing lid 22, two axial supporting elements 34 in the form of small feet are formed on the end face 30 of the coupling element 29 directed towards the housing lid 22.

If, during operation of the torque sensor 9, the first steering shaft 7 is turned, and the rotation is transmitted to the second steering shaft 11 via the torsion element 10, the coupling element 29 guided on the support ring 33 and the housing lid 22 turn together with the stator 18 and the magnetic field generator element 16 in the housing 23. Due to inertia of the second steering shaft 11, the first steering shaft 7 can be twisted relative to the second steering shaft 11 when the first steering shaft 7 is turned. This causes the magnetic field generator element 16 and the stator 18 to also twist relative to one another. The torque sensor 9 basically operates in such a way that the stator 18 thereof receives the magnetic field 17 from the magnetic field generator element 16 according to this twisting, and transmits said magnetic field to two magnetic field sensors 21 which are connected to the stator 18 via flux conducting elements 35. The flux conducting elements 35 are necessary because the magnetic field sensors 21 are arranged in a fixed manner in the housing 23 on a circuit board 37 which can be covered by a lid 36, and must not turn during the steering process. Therefore, the flux conducting elements 35 are in frictional contact with the turning stator 18, and thus receive the magnetic field 20 which is dampened by the stator 18 and transmit said magnetic field to the fixed magnetic sensor 21.

The magnetic field generator element 16 comprises north and south poles (not shown) which are arranged alternately around the rotation axis 8 in the circumferential direction. The stator 18 consists of two stator parts 18' and 18". The first stator part 18' comprises a stator ring 38 which extends in a planar manner in an axial plane relative to the rotation axis 8. On a radial inner face of the first stator ring 38, first claws 40, which are at first circumferential distances from one another and at an axial distance from the first stator ring 38, extend in the circumferential direction around the rotation axis 8. For the sake of clarity, not all of the first circumferential distances 39 and the first claws 40 are marked with reference signs in FIG. 2*a*. The second stator part 18" comprises a stator ring 41 which extends in a planar manner in an axial plane relative to the rotation axis 8, which plane is different from the axial plane in which the first stator ring 38 extends. On a radial inner face of the second stator ring 41, second claws 43, which are at second circumferential distances 42 from one another and at an axial distance from the second stator ring 41, extend in the circumferential direction around the rotation axis 8. For the sake of clarity, not all of the second circumferential distances 42 and the second claws 43 are marked with reference signs in FIG. 2*a*.

When the torque sensor is assembled, the two stator parts 18', 18" are aligned with each other on the rotation axis 8, so that the first claws 40 engage axially in the second circumferential distances 42, and the second claws 43 engage axially in the first circumferential distances 39. The two stator parts 18', 18" are held on the pins 31 of the coupling element 29 via clamping elements 44, so that they cannot be twisted relative to one another around the rotation axis 8 in the circumferential direction. For the sake of clarity, not all of the clamping elements 44 are marked with reference signs in FIG. 2*a*.

In a zero position, when the first steering shaft 7 is not twisted relative to the second steering shaft 11, a first of the two pole types of the magnetic field generator element 16 is opposite the radial inner face of each first claw 40 of the first stator part 18'—for example north poles. In contrast, in the zero position, the other of the two pole types of the magnetic field generator element 16 is opposite the radial inner face of each second claw 43 of the second stator part 18"—for example south poles. The magnetic field 17 of the magnetic field generator element 16 thus almost fully enters the first claws 40 on the first stator part 18' in the zero position, and is transmitted as a hardly dampened magnetic field 20 through the magnetic field sensors 21 via the flux conducting elements 35.

However, if the two steering shafts 7, 11 are twisted relative to each other, the poles of the magnetic field generator element 16 are also offset relative to the claws 40, 43 in the circumferential direction, and therefore each claw 40, 43 is now covered radially both by the north poles and the south poles of the magnetic field generator element 16. In this state, part of the magnetic field 17 of the magnetic field generator element 16 is short-circuited on the claws 40, 43, so that a significantly dampened magnetic field 20 reaches the magnetic sensors 21. The stronger the relative twisting of the two steering shafts 7, 11, the more parts of the magnetic field 17 of the magnetic field generator element 16 are short-circuited on the claws 40, 43. This is why the dampened magnetic field 20 depends directly on the twisting of the two steering shafts 7, 11 relative to each other.

However, changes in the dampened magnetic field 20 can be observed on the magnetic field sensors 21 if the two steering shafts 7, 11 are idle relative to each other, and only the steering wheel 6 is turned. Such behaviour can be simulated, for example, if the two steering shafts 7, 11 are interconnected by a rigid torsion element 10, and the steering wheel 6 is turned. Despite steering shafts 7, 11 being stationary relative to each other, the magnetic field sensors 21 detect a changing angular position 19 of the two steering shafts 7, 11. This effect is referred to as circulation modulation and should be as small as possible when the torque sensor 9 is operated with a twistable torsion element 10.

Various examinations have shown that the circulation modulation can be reduced using claws 40, 43 having the contour of a mathematically smooth curve when viewed across the circumferential direction around the rotation axis 8. That is to say, the claws 40, 43 should be free of edges. A possible shape of these claws 40, 43 shall be described in more detail in the following with reference to FIG. 3.

Each claw 40, 43 has a base 45 and a head 46 positioned on the base 45. For the sake of clarity, these elements are provided with reference signs only on one of the claws 40, 43 in FIG. 3. Both the base 45 and the head basically have circular designs with a base radius 47 and a head radius 48. The base radius 47 is bigger than the head radius 48, so that the base 45 is wider than the head 46 in the circumferential direction around the rotation axis 8. Preferably, the base radius 47 is twice as big as the head radius 48.

Both the head 46 and the base 45 have a turning point 49 on each side when viewed in the circumferential direction. The resulting four turning points 49 define a transition region 50, at which a curve of the contour of the respective claw 40, 43 is negative relative to the curve in the region of the head 46 and the base 45. The transition region 50 is also circular, with a transition radius 51 which is the same size as the base radius 47. Thus, the curves of the transition region 50 and the base 45 are the same size, but with reversed signs. If the claws 40, 43 formed in this manner engage with one another, an air gap 52 therebetween in a region between the two stator rings 38, 41 is constant.

Each claw 40, 43 has a central axis 53 extending in parallel with the rotation axis 8, to which the claws 40, 43 are formed axis-symmetrically. Furthermore, in the state shown in FIG. 3, respectively adjacent claws 40, 43 are arranged and formed point-symmetrically to a symmetry point 54 which is in the centre of the air gap 52 and in the centre between the two stator rings 38, 41 in each case.

Examinations on the effect of the circulation modulation were carried out with the stator 18 shown in FIG. 3 and installed in the torque sensor 9 according to FIGS. 2*a* and 2*b*. To this end, FIG. 4 shall firstly be used to explain the exact effect of the circulation modulation on the angular position signal 18 of the torque sensor 9.

In FIG. 4, the angular position signal 18 is plotted versus a steering angle 55 specifying the wheel angle 28 in the vehicle 1.

As shown in FIG. 4, the angular position signal 18, i.e. the signal specifying the differential angle between the two steering shafts 7, 11, does not remain constant when the steering wheel 6 is turned but changes back and forth more or less periodically in a region with an upper peak value 56 and a lower peak value 57. Hereinafter, a distance between the two peak values 56, 57 is referred to as peak-to-peak distance 58.

FIGS. 5*a* to 5*c* show examination results based on peak-to-peak distance 58, plotted versus a relative angular position 59 of the two steering shafts 7, 11 to each other. That is to say, the steering shafts 7, 11 were arranged in a fixed manner in a specific relative angular position 59 to each other, so that the magnetic field generator element 16 and the stator 18 are also fixed in the same relative angular position 59 to each other. The peak-to-peak distance 58 was then determined by plotting a diagram in a similar manner to FIG. 4. FIG. 5*a* to 5*c* represent the examination results for various contours of the claws of the stator 18. They do not represent absolute measurement values, but rather only show the proportions of the examination results relative to one another.

FIG. 5*a* shows the examination results for the rectangular claw shape as known from JPH03-048714U. In contrast, FIG. 5*b* shows the examination results for the trapezoidal claw shape as known from FR 2872902 B1. It shows clearly that in the region of small relative angular positions 59 of the steering shafts 7, 11, the trapezoidal claw shape generates a significantly smaller peak-to-peak distance 58 in the angular position signal 18 of the torque sensor 9 and thus significantly fewer errors due to the circulation modulation by comparison with the rectangular claw shape, however, the errors increase significantly with larger relative angular positions 59 of the steering shafts 7, 11 by comparison with the rectangular claw shape.

As shown in FIG. 5c, the claw shape from FIG. 3, by comparison with the two known claw shapes, introduces a smaller peak-to-peak distance 58 into the angular position signal 18 of the torque sensor 9 across the entire region of the relative angular position 59 of the steering shafts 7, 11. This results in significantly fewer errors in torque detection.

The invention claimed is:

1. A stator to guide a location-dependent magnetic field in a circumferential direction around a rotation axis, said stator comprising:
   a first stator ring revolving around the rotation axis, and
   a second stator ring revolving around the rotation axis, which is arranged concentrically with the first stator ring,
   the first and second stator ring including claws which are arranged so as to revolve around the rotation axis and at a distance from one another in the circumferential direction and engage with one another at least on a toothing axial plane, said claws being separated from one another by an air gap in such a way that, when the magnetic field is arranged in the toothing axial plane, the magnetic field is guided towards the stator rings via the claws according to a relative angular position,
   wherein
   each claw has the contour of a mathematically smooth curve when viewed across the circumferential direction, wherein each claw has a base, above which a head is supported on the respective stator ring, said head being smaller than the base when viewed in the circumferential direction, and the base and the head merge with one another in a transition region having a curve which is negative starting from a base curve.

2. The stator as claimed in claim 1, wherein the base curve and the curve of the transition region have the same dimensions.

3. The stator as claimed in claim 1, wherein the head, when viewed in the circumferential direction, has an extension which is between a quarter and three quarters of the extension of the base in the circumferential direction.

4. The stator as claimed in claim 1, wherein regions of the base and the head have circular or oval designs.

5. The stator as claimed in claim 1, wherein the claws are arranged axis-symmetrically to one another in the circumferential direction on each stator ring.

6. The stator as claimed in claim 1, wherein the claws are arranged point-symmetrically to one another in the circumferential direction between the stator rings.

7. The stator as claimed in claim 1, wherein the edges of each claw are arranged at a right angle to a stator axial plane which is different from the toothing axial plane, in which their respective stator ring is positioned.

8. A sensor to detect a torque between a first shaft and a second shaft, which are interconnected by a torsion bar, the sensor comprising:
   a stator connected to the first shaft; the stator including
      a first stator ring revolving around a rotation axis, and
      a second stator ring revolving around the rotation axis, which is arranged concentrically with the first stator ring,
      the first and second stator ring including claws which are arranged so as to revolve around the rotation axis and at a distance from one another in the circumferential direction and engage with one another at least on a toothing axial plane, said claws being separated from one another by an air gap in such a way that, when the magnetic field is arranged in the toothing axial plane, the magnetic field is guided towards the stator rings via the claws according to a relative angular position,
      wherein
      each claw has the contour of a mathematically smooth curve when viewed across the circumferential direction;
   a magnetic field generator connected to the second shaft, and which is arranged co-axially with the rotation axis to generate and feed the magnetic field into the stator, and
   a magnetic field sensor to detect a magnetic field from the magnetic field generator passing the stator, wherein each claw has a base, above which a head is supported on the respective stator ring, said head being smaller than the base when viewed in the circumferential direction, and the base and the head merge with one another in a transition region having a curve which is negative starting from a base curve.

9. The sensor as claimed in claim 8, wherein the base curve and the curve of the transition region have the same dimensions.

10. The sensor as claimed in claim 8, wherein the head, when viewed in the circumferential direction, has an extension which is between a quarter and three quarters of the extension of the base in the circumferential direction.

11. The sensor as claimed in claim 8, wherein regions of the base and the head have circular or oval designs.

12. The sensor as claimed in claim 8, wherein the claws are arranged axis-symmetrically to one another in the circumferential direction on each stator ring.

13. The sensor as claimed in claim 8, wherein the claws are arranged point-symmetrically to one another in the circumferential direction between the stator rings.

14. The sensor as claimed in claim 8, wherein the edges of each claw are arranged at a right angle to a stator axial plane which is different from the toothing axial plane, in which their respective stator ring is positioned.

* * * * *